US010699036B2

(12) United States Patent
Zhang et al.

(10) Patent No.: US 10,699,036 B2
(45) Date of Patent: Jun. 30, 2020

(54) METHOD AND SYSTEM FOR TESTING VEHICLE

(71) Applicant: Baidu Online Network Technology (Beijing) Co., Ltd., Beijing (CN)

(72) Inventors: Tianlei Zhang, Beijing (CN); Wenli Yang, Beijing (CN); Yuchang Pan, Beijing (CN); Haowen Sun, Beijing (CN)

(73) Assignee: Baidu Online Network Technology (Beijing) Co., LTD, Beijing (CN)

( * ) Notice: Subject to any disclaimer, the term of this patent is extended or adjusted under 35 U.S.C. 154(b) by 713 days.

(21) Appl. No.: 15/385,476

(22) Filed: Dec. 20, 2016

(65) Prior Publication Data
US 2018/0011964 A1 Jan. 11, 2018

(30) Foreign Application Priority Data
Jul. 7, 2016 (JP) .............................. 2016 1 0532297

(51) Int. Cl.
*G06G 7/48* (2006.01)
*G06F 30/15* (2020.01)
*G06F 30/20* (2020.01)
*G06F 111/02* (2020.01)

(52) U.S. Cl.
CPC .............. *G06F 30/15* (2020.01); *G06F 30/20* (2020.01); *G06F 2111/02* (2020.01)

(58) Field of Classification Search
None
See application file for complete search history.

(56) References Cited

U.S. PATENT DOCUMENTS

| | | | | |
|---|---|---|---|---|
| 5,421,004 A * | 5/1995 | Carpenter | ........... | G06F 11/2736 714/25 |
| 2006/0235674 A1* | 10/2006 | Voigt | .................. | G06F 17/5009 703/17 |
| 2009/0199047 A1* | 8/2009 | Vaitheeswaran | .... | G06F 11/3409 714/47.2 |
| 2010/0047760 A1* | 2/2010 | Best | ......................... | G09B 7/00 434/362 |
| 2011/0184713 A1* | 7/2011 | Yang | ................... | G06F 17/5022 703/13 |

(Continued)

OTHER PUBLICATIONS

Ananthanarayanan et al. PacMan: Coordinated Memory Caching for Parallel Jobs NSDI 2012 (Year: 2012).*

*Primary Examiner* — Rehana Perveen
*Assistant Examiner* — Cuong V Luu
(74) *Attorney, Agent, or Firm* — Knobbe, Martens, Olson & Bear, LLP

(57) ABSTRACT

The present disclosure discloses methods and systems for testing the vehicle. In some embodiments, a method includes receiving, by an emulation server, a test task and a test scenario set required for executing the test task sent from a client; distributing, by the emulation server, each of the test scenarios to first emulation executors respectively, and sending the test task to each of the first emulation executors; acquiring, by the emulation server, a test result of the test task from each of the first emulation executors; and comparing, by the emulation server, the acquired test result with a preset test standard to generate feedback information of the test task, and sending the feedback information to the client.

12 Claims, 4 Drawing Sheets

(56) References Cited

U.S. PATENT DOCUMENTS

| | | | |
|---|---|---|---|
| 2011/0191078 A1* | 8/2011 | Davidich | G06F 17/5004 |
| | | | 703/6 |
| 2012/0221279 A1* | 8/2012 | Zhang | G06F 11/3688 |
| | | | 702/108 |
| 2014/0156253 A1* | 6/2014 | McIlvain | G06F 11/27 |
| | | | 703/28 |
| 2014/0167953 A1* | 6/2014 | Dunlop | G09B 19/00 |
| | | | 340/515 |
| 2014/0177821 A1* | 6/2014 | Ristock | G06Q 10/0631 |
| | | | 379/266.08 |
| 2014/0278052 A1* | 9/2014 | Slavin | G01O 21/3492 |
| | | | 701/400 |
| 2015/0050623 A1* | 2/2015 | Falash | G09B 9/24 |
| | | | 434/38 |
| 2015/0199458 A1* | 7/2015 | Bacon | G06F 17/5009 |
| | | | 703/8 |
| 2015/0220370 A1* | 8/2015 | Ujibashi | G06F 9/5088 |
| | | | 718/104 |
| 2016/0054783 A1* | 2/2016 | Rajappa | G06F 1/3203 |
| | | | 700/291 |
| 2016/0163216 A1* | 6/2016 | Galibois | G09B 9/02 |
| | | | 434/49 |
| 2016/0188450 A1* | 6/2016 | Appusamy | G06F 11/3664 |
| | | | 714/38.1 |
| 2016/0321381 A1* | 11/2016 | English | G06F 17/5009 |
| 2017/0050644 A1* | 2/2017 | List | B60W 50/14 |
| 2017/0177653 A1* | 6/2017 | Goda | G06F 9/48 |
| 2017/0268948 A1* | 9/2017 | List | G01L 5/13 |
| 2017/0353524 A1* | 12/2017 | Dacutanan | H04W 4/24 |
| 2019/0012909 A1* | 1/2019 | Mintz | G08G 1/0112 |

* cited by examiner

METHOD AND SYSTEM FOR TESTING VEHICLE

CROSS-REFERENCE TO RELATED APPLICATION

This application claims priority to Chinese Application No. 201610532297.5, filed on Jul. 7, 2016, entitled "METHOD AND SYSTEM FOR TESTING VEHICLE," the entire disclosure of which is hereby incorporated by reference.

TECHNICAL FIELD

The present disclosure relates to the field of vehicle test technologies, and in particular, to a method and system for testing a vehicle.

BACKGROUND

With the development of the society, vehicles have become commonly used transport means. To ensure good performance and driving safety of a vehicle in different situations, before the vehicle design is finalized, a series of test experiments are needed to test the functionalities of the control system and others in the vehicle.

A road test performed directly on the vehicle during a test phase may increase test costs and may present some danger. Therefore, performances of the control system and others in the vehicle are tested by using simulation and emulation in the industry. Generally, to improve the performance of the vehicle, testers need to carry out a plurality of emulation experiments to test the performance of the control system and others of the vehicle in a large number of test scenarios. However, the conventional emulation test method is generally implemented based on a single machine, that is, a single emulation-executing machine tests a test task in different test situations sequentially. Therefore, it takes half a year or even a full year to complete the emulation tests in numerous scenarios, resulting in long test period and low efficiency problems.

SUMMARY

An objective of some embodiments of the present disclosure is to provide an improved method and system for testing the vehicle, to solve the technical problems mentioned in the Background.

In the first aspect, the present disclosure provides a method for testing a vehicle, wherein the method includes: receiving, by an emulation server, a test task and a test scenario set required for executing the test task sent from a client, the test scenario set comprising a plurality of test scenarios, and the client configured to provide a user with a man-machine interface to cause the user to configure the test task at the client; distributing, by the emulation server, each of the test scenarios to first emulation executors respectively, and sending the test task to each of the first emulation executors, such that each of the first emulation executors executes the test task in parallel in one of the test scenarios; acquiring, by the emulation server, a test result of the test task from each of the first emulation executors; and comparing, by the emulation server, the acquired test result with a preset test standard to generate feedback information of the test task, and sending the feedback information to the client.

In some embodiments, the method further includes: selecting, by the client, the test scenario set from a test scenario module, wherein the test scenario module is configured to store the test scenarios and scenario data of the test scenarios in a categorical approach.

In some embodiments, the method further includes: determining, by the first emulation executor, whether the scenario data of the test scenario distributed to the first emulation executor is in a local cache; if yes, acquiring, by the first emulation executor, the scenario data of the test scenario from the local cache; and if no, acquiring, by the first emulation executor, the scenario data of the test scenario from the test scenario module, and storing the acquired scenario data of the test scenario in the local cache.

In some embodiments, before acquiring, by the emulation server, a test result of the test task from each of the first emulation executors, the method further includes: scheduling, by the emulation server, a second emulation executor as the first emulation executor to re-execute the test task, when it is determined by the emulation server that the first emulation executor fails.

In some embodiments, the first emulation executors are independent of one another.

In some embodiments, a waiting queue is arranged in the emulation server; and the method further includes: querying, by the emulation server, whether there is an idle emulation executor; if yes, selecting, by the emulation server, a preset number of emulation executors from the idle emulation executor as the first emulation executor; and if no, storing, by the emulation server, the test task in the waiting queue and continuing querying until an idle emulation executor is determined.

In the second aspect, the present disclosure provides a system for testing the vehicle, wherein the system includes: an emulation server, an emulation executor, and a client, wherein the emulation server is connected to the emulation executors and to the client; the client provides a user with a man-machine interaction interface, configures a test task and a test scenario set required for executing the test task in response to an operating instruction of the user, sends the test task and the test scenario set to the emulation server, and receives feedback information of the test task sent from the emulation server, wherein the test scenario set comprises a plurality of test scenarios; a plurality of the emulation executor execute an identical test task in parallel in one of the test scenarios, generate test results, and send the test results to the emulation server; and the emulation server is configured to distribute the test scenarios in the test scenario set received from the client to the emulation executors respectively, send the test task received from the client to each of the emulation executors, and compare the test result received from each of the emulation executors with a preset test standard to generate feedback information of the test task.

In some embodiments, the system further includes: a test scenario module, configured to store the test scenarios and scenario data of the test scenarios in a categorical approach, the test scenario module is connected to the client, such that the client selects the test scenario set from the test scenario module; and the test scenario module is connected to the emulation executor, such that the emulation executor acquires from the test scenario module the scenario data of the test scenario distributed to the emulation executor, and store the scenario data to a local cache of the emulation executor.

In some embodiments, the emulation server is further configured to monitor a health state of each of the emulation executors, and schedule a normal emulation execute to replace a failed emulation executor when the failed emulation executor is determined.

In some embodiments, the emulation executors are independent of one another.

In some embodiments, the emulation server is further configured to query whether there is an idle emulation executor, and select the idle emulation executor to execute the test task; and a waiting queue is arranged in the emulation server and configured to store the test task when no idle emulation executor is determined.

In the method and system for testing the vehicle provided in the present disclosure, the emulation server may distribute the test task and the test scenarios in the test scenario set sent from the client to the plurality of first emulation executors respectively, each of the first emulation executors executes the test task in parallel in a single test scenario, and then, the emulation server acquires the test results of the test task, compares the test results with a test standard to generate feedback information of the test task, and finally sends the feedback information to the client, to accomplish the above test task. The test method shortens the time for testing the vehicle and improves the efficiency of vehicle test by using the plurality of first emulation executors to execute the test task in parallel in different test scenarios.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
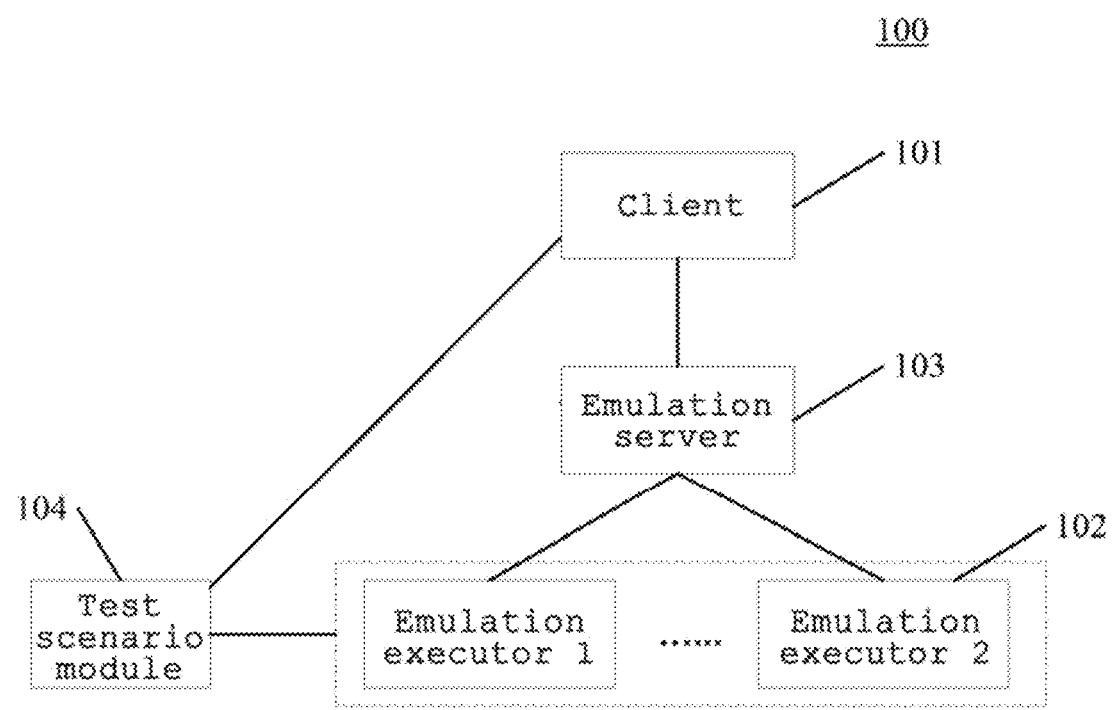
FIG. 1 shows an architectural diagram of some embodiments of a system for testing the vehicle according to the present disclosure.

FIG. 1 shows an architectural diagram 100 of some embodiments of a system for testing the vehicle according to the present disclosure. As shown in the drawing, the system 100 for testing the vehicle may include a client 101, an emulation executor 102, and an emulation server 103.

In some embodiments, the emulation server 103 may be connected to the emulation executors 102 and the client 101 separately, as shown in FIG. 1. The client 101 may provide a man-machine interaction interface for a user. When the user operates at the client 101, the client 101 may configure, in response to an operating instruction input by the user, a test task that needs to be tested and a test scenario set required for executing the test task, and send the test task and the test scenario set to the emulation server 103. The emulation server 103 may receive the test task and the test scenario set corresponding to the test task sent from the client 101, then distribute test scenarios in the test scenario set to selected emulation executor 102, and send the test task to the emulation executor 102 to which each of the test scenarios is distributed. The system 100 may include a plurality of emulation executors 102. Each emulation executor 102 may be configured to execute a test task in a single test scenario, generate the test result of the test task, and send the test result to the emulation server 103. The emulation server 103 may compare the test result with a preset test standard to generate feedback information, and send the feedback information to the client 101, such that the user acquires the feedback information conveniently.

It should be noted that, generally there are a plurality of emulation executors 102 in the system 100 that receive the same test task (different test scenarios may be distributed to the emulation executors 102), and the plurality of emulation executors 102 can execute the test task in parallel. However, the conventional vehicle test system generally uses a single emulation executor to execute a test task in various test scenarios sequentially, the total time spent for the test task is a sum of time spent for executing the test task in the test scenarios, and the test costs a lot of time. It can be seen that, the system 100 for testing a vehicle in some embodiments can shorten the test time and improve the test efficiency. For example, when the user needs to test the performance of a decision control algorithm of a vehicle in 5 different test scenarios, that is, the test task is to test the decision control algorithm of the vehicle, the user may send the test task and the test scenarios to the emulation server 103 through the client 101, then the emulation server 103 determines, from the emulation executors 102, 5 first emulation executors that are configured to execute the test task, distribute 5 test scenarios respectively to the 5 first emulation executors determined above, and send the test task to each of the first emulation executors, such that each of the first emulation executors executes the test task in a test scenario distributed thereto. It should be noted that, the 5 first emulation executors execute the test task at the same time, the time spent by each of the first emulation executors to execute the test task is t1, t2, t3, t4, and t5 respectively, and the time spent by the test task is the maximum value among t1, t2, t3, t4, and t5. However, in the prior art, the time spent by the test task is a sum of t1, t2, t3, t4, and t5, and it can be seen that, the system for testing the vehicle in some embodiments can shorten the vehicle test time and improve the test efficiency.

In some optional implementation manners of some embodiments, the system 100 for testing the vehicle may further include a test scenario module 104, as shown in the drawing, and the test scenario module 104 may be configured to store test scenarios and scenario data of the test scenarios in a categorical approach. The test scenario module 104 may be connected to the client 101, such that the client 101 can select, from the test scenario module 104, test scenarios required for executing the test task, to form the test scenario set. The test scenario module 104 may further be connected to the emulation executor 102, such that the emulation executor 102 can acquire, from the test scenario module 104, scenario data of a test scenario distributed to the emulation executor 102. Then, the emulation executor 102 may store the scenario data of the test scenario in a local cache of the emulation executor 102, such that when the scenario data of the test scenario is needed the next time, the emulation executor 102 can invoke the scenario data directly from the local cache, and therefore, the emulation executor does not have to acquire test scenario data from the test scenario module 104 every time, thereby shortening the test time and improving the test efficiency.

In some optional implementations of some embodiments, the emulation server 103 may further be configured to monitor health states of the emulation executors 102, and once a failed emulation executor 102 is found, the emulation server 103 may take a corresponding measure to solve the problem, thereby avoiding the failure of the emulation executor 102 from causing test result loss. For example, when the emulation server 103 monitors that there is a failed emulation executor 102 in the emulation executors 102 that are executing the test task, the emulation server 103 may invoke a normal emulation executor 102 to replace the failed emulation executor 102, and control the normal emulation executor 102 to re-execute the test task, thereby ensuring that the emulation executors 102 can execute the test task in various test scenarios in the test scenario set, to ensure the completeness of the test.

In some optional implementations of some embodiments, the system 100 for testing the vehicle may include a great number of emulation executors 102, and the emulation executors 102 may be isolated from one another and do not communication with each other, thereby avoiding interference when the emulation executors 102 execute the test task.

In some optional implementations of some embodiments, the emulation server 103 may further be provided with a waiting queue, and when the emulation server 103 receives the test task sent from the client 101 and there is no idle emulation executor 102 that can execute the test task, the emulation server 103 may store the test task to the waiting queue arranged by it. That is, the emulation server 103 may further be configured to query whether there are idle emulation executors 102 in the system 100. If the emulation server 103 determines that there are idle emulation executors 102 in the system 100, the emulation server 103 may select a preset number of emulation executors 102 therefrom, and send the test task to the selected emulation executors 102. If the emulation server 103 determines that there is no idle emulation executor 102 in the system 100, the emulation server 103 may store the test task to the waiting queue and continue querying the emulation executors 102 in the system 100, till determining that there are idle emulation executors 102 in the system 100. The emulation server 103 may select idle emulation executors 102 to execute the test task, to balance loads of the emulation executors 102.

In some optional implementations of some embodiments, the system 100 for testing the vehicle may be applicable to a cloud computing environment. The number of the emulation executors 102 in the system 100 can determine the number of test tasks that can be received, and the user may generally send the task to the emulation server 103 through the client. Therefore, the system 100 may further set the number of the clients 101 according to the number of the emulation executors 102. The number of clients 101 and the number of emulation executors 102 may be positively correlated, to avoid waste due to too many clients 101.

The system 100 for testing the vehicle provided in some embodiments of the present disclosure includes the client 101, the emulation executors 102, and the emulation server 103, such that the user may submit the test task to the emulation server 103 through the client 101, and the emulation server 103 may control each of the emulation executors 102 to execute the test task in parallel in a single test scenario distributed thereto, thereby shortening the test time and improving the test efficiency.

Figure 2:
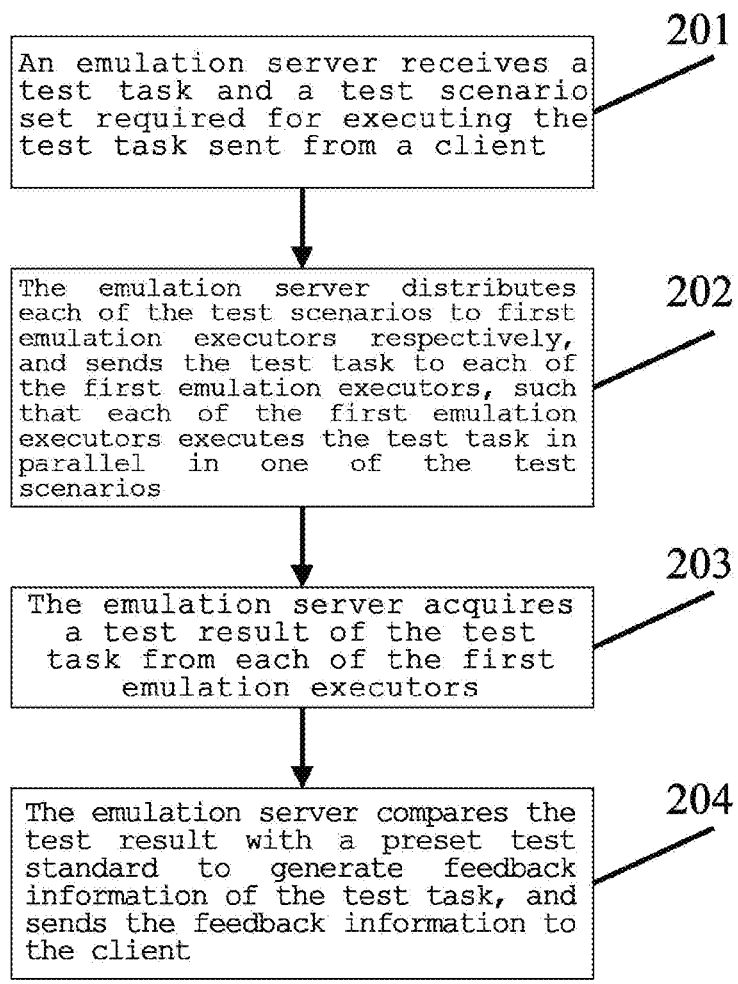
FIG. 2 shows a flow chart of some embodiments of a method for testing a vehicle according to the present disclosure.

Still referring to FIG. 2, a procedure 200 of some embodiments of a method for testing a vehicle according to the present disclosure is shown. The method for testing the vehicle includes the following steps:

Step 201: An emulation server receives a test task and a test scenario set required for executing the test task sent from a client.

In some embodiments, the emulation server in the method for testing the vehicle may be connected to the client through wireless communication, and the emulation server may receive a test task and test scenarios required for executing the test task sent from the client. Here, the client may provide a man-machine interaction interface for testing the vehicle to a user, and the user may configure a test task for testing the vehicle at the client. The test scenario set may include a plurality of test scenarios.

Generally, the user may configure various test tasks of the vehicle through the client, for example, the test task here may be testing the performance of a decision control algorithm of a vehicle. The test scenarios generally refer to a set of specific successive events occurred in a specific environment, and may be described as a combination of classes such as weather, road structure, traffic light condition, and obstacle information. For example, a test scenario may be described as a pedestrian crossing the road at a crossroad without any traffic light in a sunny day.

In some optional implementations of some embodiments, the client may select, from the test scenario module, test scenarios required for executing the test task to form the test scenario set. Here, the test scenario module is mainly configured to store test scenarios and scenario data of the test scenarios in a categorical approach.

Step 202: The emulation server distributes each of the test scenarios to first emulation executors respectively, and sends the test task to each of the first emulation executors, such that each of the first emulation executors executes the test task in parallel in one of the test scenarios.

In some embodiments, the emulation server may distribute the test task and test scenarios in the test scenario set received from the client to the first emulation executors, and here, the first emulation executor may be configured to execute the test task in a single scenario. Specifically, the emulation server may distribute the test scenarios in the scenario set to the first emulation executors respectively, and send the test task to the first emulation executors. Finally, each of the first emulation executors executes the test task in parallel in a single scenario distributed thereto. For example, the test scenario set includes 5 test scenarios, and the emulation server may distribute the 5 test scenarios to 5 different first emulation executors respectively, such that each first emulation executor has one test scenario distributed thereto, then the emulation server sends the test task to the 5 first emulation executors, and finally, the 5 first emulation executors execute the test task simultaneously in the test scenarios distributed thereto. It is understandable that, if the time spent by the first emulation executors executing the test task is t1, t2, t3, t4, and t5 respectively, the time spent by the test task is the maximum value among t1, t2, t3, t4, and t5. However, in the prior art, the time spent by the test task in the prior art is a sum of t1, t2, t3, t4, and t5.

Therefore, it can be seen that the vehicle test performed by using the method in some embodiments can shorten the time for testing the vehicle and improve the efficiency of vehicle test.

In some optional implementations of some embodiments, the first emulation executors may be independent of one another. That is, the first emulation executors are isolated from one another and do not communication with each other, thereby avoiding interference when the first emulation executors execute the test task.

In some optional implementations of some embodiments, the emulation server may further monitor health states of the first emulation executors in real time. When the emulation server monitors that there is a failed first emulation executor in the first emulation executors that are executing the test task, the emulation server may schedule a normal second emulation executor as a first emulation executor, to replace the failed first emulation executor. The normal first emulation executor may re-execute the test task, thereby ensuring that the first emulation executors can execute the test task in all test scenarios in the test scenario set, to ensure the completeness of the test.

Step 203: The emulation server acquires the test result of the test task from each of the first emulation executors.

In some embodiments, after the first emulation executors execute the test task simultaneously in the test scenarios distributed thereto, the corresponding test results may be acquired. The emulation server may acquire the test results of the test task in different test scenarios from the first emulation executors. The test results may be driving speed, deceleration time, and the like.

Step 204: The emulation server compares the test result with a preset test standard to generate feedback information of the test task, and sends the feedback information to the client.

In some embodiments, a test standard may be preset, the emulation server may acquire the test results of the test task in different test scenarios from the first emulation executors, and then compare the test results with the test standard to generate the feedback information. For example, the emulation server acquires a driving time and a driving distance of a vehicle in a certain test scenario, and the emulation server may determine the test result of the vehicle (for example, an average speed), and then compare the test result with the preset test standard, to generate feedback information indicating a qualified test or an unqualified test. The emulation server may send the feedback information of the test task to the client, such that the user determines the performance of the tested vehicle through the client.

In the method for testing a vehicle provided in some embodiments of the present disclosure, the emulation server may distribute the test task and the test scenarios in the test scenario set sent from the client to the plurality of first emulation executors respectively, each of the first emulation executors executes the test task in parallel in a single test scenario, and then, the emulation server acquires the test results of the test task, compares the test results with a test standard to generate feedback information of the test task, and finally sends the feedback information to the client, to accomplish the above test task. The test method shortens the time for testing the vehicle and improves the efficiency of vehicle test by using the plurality of first emulation executors to execute the test task in parallel in different test scenarios.

Figure 3:
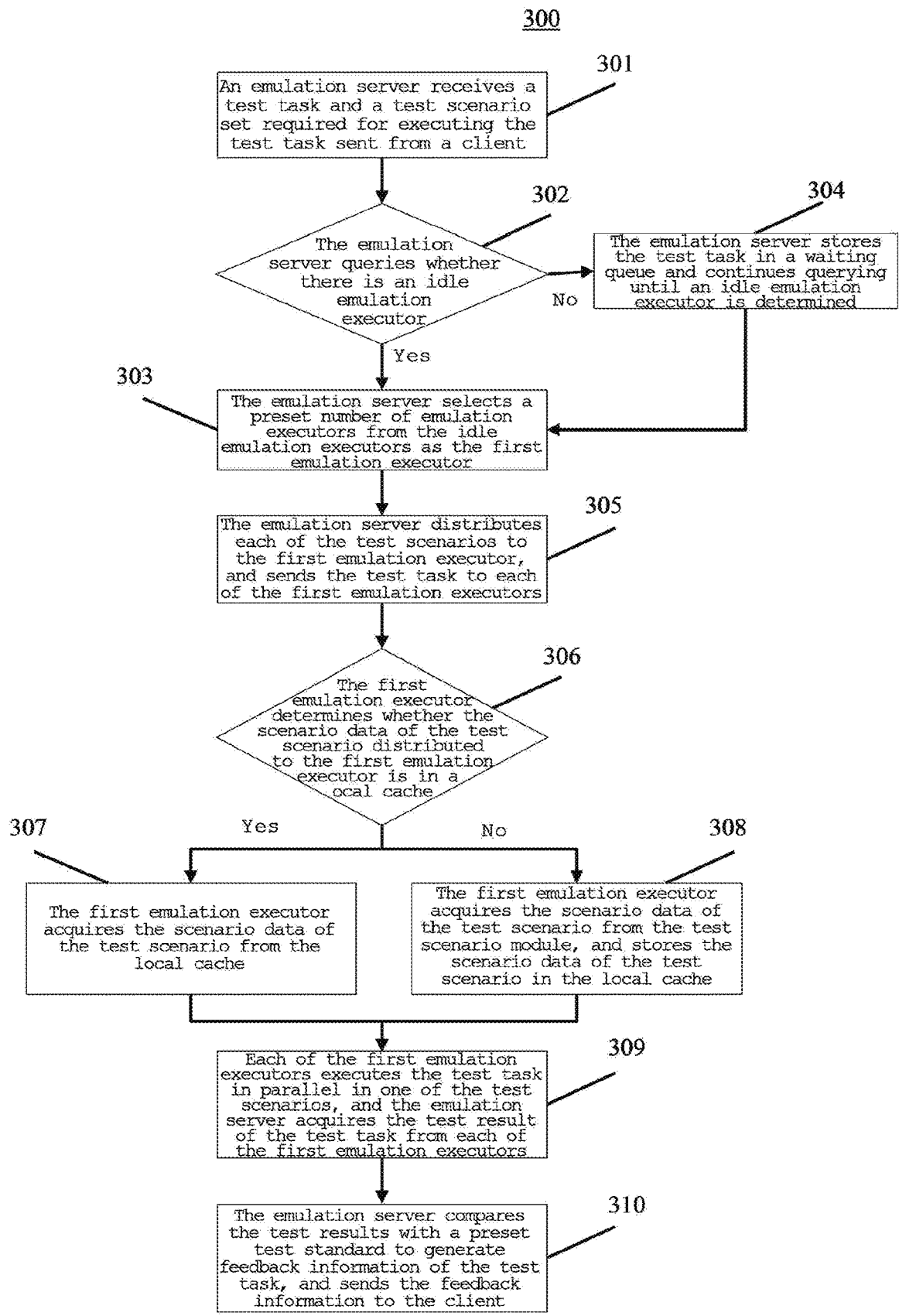
FIG. 3 shows a flow chart of some embodiments of a method for testing a vehicle according to the present disclosure.

Further referring to FIG. 3, it shows a procedure 300 of some embodiments of a method for testing a vehicle. The procedure 300 of the method for testing a vehicle includes the following steps:

Step 301: An emulation server receives a test task and a test scenario set required for executing the test task sent from a client.

In some embodiments, the emulation server in the method for testing a vehicle may be connected to the client through wireless communication, and the emulation server may receive a test task and test scenarios required for executing the test task sent from the client. Here, the client may provide a man-machine interaction interface for testing the vehicle to a user, and the user may configure a test task for testing the vehicle at the client. The test scenario set may include the plurality of test scenarios.

Step 302: The emulation server queries whether there is an idle emulation executor.

In some embodiments, the emulation server may query whether there are idle emulation executors based on the test task and the test scenario set required for executing the test task received in step 301, to select a preset number of idle emulation executors to serve as the first emulation executors for executing the test task, and the method can balance loads of the emulation executors. If the emulation server determines that there is an idle emulation executor, the procedure may proceed to step 303; and if the emulation server determines that there is no idle emulation executor, the procedure may proceed to step 304.

Step 303: The emulation server selects a preset number of emulation executors from the idle emulation executors as the first emulation executor.

In some embodiments, based on that there are idle emulation executors determined in step 302, the emulation server may select a preset number of emulation executors from the idle emulation executors to serve as the first emulation executors for executing the test task.

In some optional implementations of some embodiments, in the case that the emulation executor determines that there are idle emulation servers, the emulation server may further determine the number of the idle emulation executor. If the number of the idle emulation executors is greater than or equal to the number of first emulation executors required for executing the test task, the emulation server may select first emulation executors required for the test task therefrom. If the number of the idle emulation executors is less than the number of first emulation executors required for executing the test task, the emulation server may use all the idle emulation executors to serve as the first emulation executors, and then continuously wait for idle emulation executors.

Step 304: The emulation server stores the test task in the waiting queue and continues querying until an idle emulation executor is determined.

In some embodiments, the emulation server may preset a waiting queue, and the waiting queue may be configured to store the test task temporarily. Based on that there is no idle emulation executor determined in step 302, the emulation server may store the test task to the waiting queue, and continue querying for idle emulation executors, till determining that there are idle emulation executors, and the procedure may proceed to step 303, that is, the emulation server may determine a preset number of emulation executors from the idle emulation executors to serve as the first emulation executors for executing the test task.

Step 305: The emulation server distributes each of the test scenarios to the first emulation executor, and sends the test task to each of the first emulation executors.

In some embodiments, based on the first emulation executors for executing the test task determined in step 303 or 304, the emulation server may distribute the test scenarios in the received test scenario set to the first emulation executors, and then the emulation server may send the received test task to the first emulation executors, such that the first emulation executors execute the test task in different test scenarios.

Step 306: The first emulation executor determines whether the scenario data of the test scenario distributed to the first emulation executor is in a local cache.

In some embodiments, after the first emulation executor has a test scenario distributed thereto, the first emulation executor may search the local cache for whether there is scenario data of the distributed test scenario. If there is scenario data of the test scenario in the local cache of the first emulation executor, the procedure proceeds to step 307. If there is no scenario data of the test scenario in the local cache of the first emulation executor, the procedure proceeds to step 308.

Step 307: The first emulation executor acquires the scenario data of the test scenario from the local cache.

In some embodiments, based on that there is scenario data of the test scenario in the local cache of the first emulation executor determined in step 306, the first emulation executor may acquire, from the local cache, the scenario data of the test scenario distributed to the first emulation executor.

Step 308: The first emulation executor acquires the scenario data of the test scenario from the test scenario module, and stores the scenario data of the test scenario in the local cache.

In some embodiments, based on that there is no scenario data of the test scenario in the local cache of the first emulation executor determined in step 306, the first emulation executor may acquire, from the test scenario module, the scenario data of the test scenario distributed thereto. Then, the acquired scenario data of the test scenario is stored to the local cache of the first emulation executor, such that when the scenario data of the test scenario is needed the next time, the first emulation executor may call the scenario data directly from the local cache. Therefore, the efficiency of the first emulation executor executing the test task is improved.

Step 309: Each of the first emulation executors executes the test task in parallel in one of the test scenarios, and the emulation server acquires the test results of the test task from each of the first emulation executors.

In some embodiments, after the first emulation executors acquire the scenario data of the test scenarios distributed thereto and the test task, the first emulation executors execute the test task in parallel, and generate test results. Then, the emulation server may acquire the test results of the test task from the first emulation executors. It is understandable that, if there are 5 first emulation executors executing the test task simultaneously in 5 different test scenarios, and the time spent by the 5 first executors executing the test task is t1, t2, t3, t4, and t5 respectively, the time spent by the test task is the maximum value among t1, t2, t3, t4, and t5; however, in the prior art, the time spent by the test task in the prior art is a sum of t1, t2, t3, t4, and t5. It can be seen that, carrying out vehicle test by using the method in some embodiments can shorten the time for testing the vehicle and improve the efficiency of vehicle test.

Step 310: The emulation server compares the test results with a preset test standard to generate feedback information of the test task, and sends the feedback information to the client.

In some embodiments, a test standard may be preset, the emulation server may acquire the test results of the test task in different test scenarios from the first emulation executors, and then compare the test results with the test standard to generate feedback information.

For example, the emulation server acquires a driving time and a driving distance of a vehicle in a certain test scenario, and the emulation server may determine the test result of the vehicle (for example, an average speed), and then compare the test result with the preset test standard, to generate feedback information indicating a qualified test or an unqualified test. The emulation server may send the feedback information of the test task to the client, such that the user determines the performance of the tested vehicle through the client.

It can be seen from FIG. 3 that, compared with the embodiments corresponding to FIG. 2, the procedure 300 of the method for testing a vehicle in some embodiments emphasizes the step of the emulation server querying for idle emulation executors, and the step of the first emulation executor determining whether there is scenario data of a distributed test scenario in a local cache. Therefore, the solution described in some embodiments may select idle emulation executors to serve as the first emulation executors for executing the test task, to balance loads of the emulation executors. Moreover, the first emulation executors may acquire the scenario data of the test scenario directly from the local cache, thereby improving the test efficiency.

Figure 4:
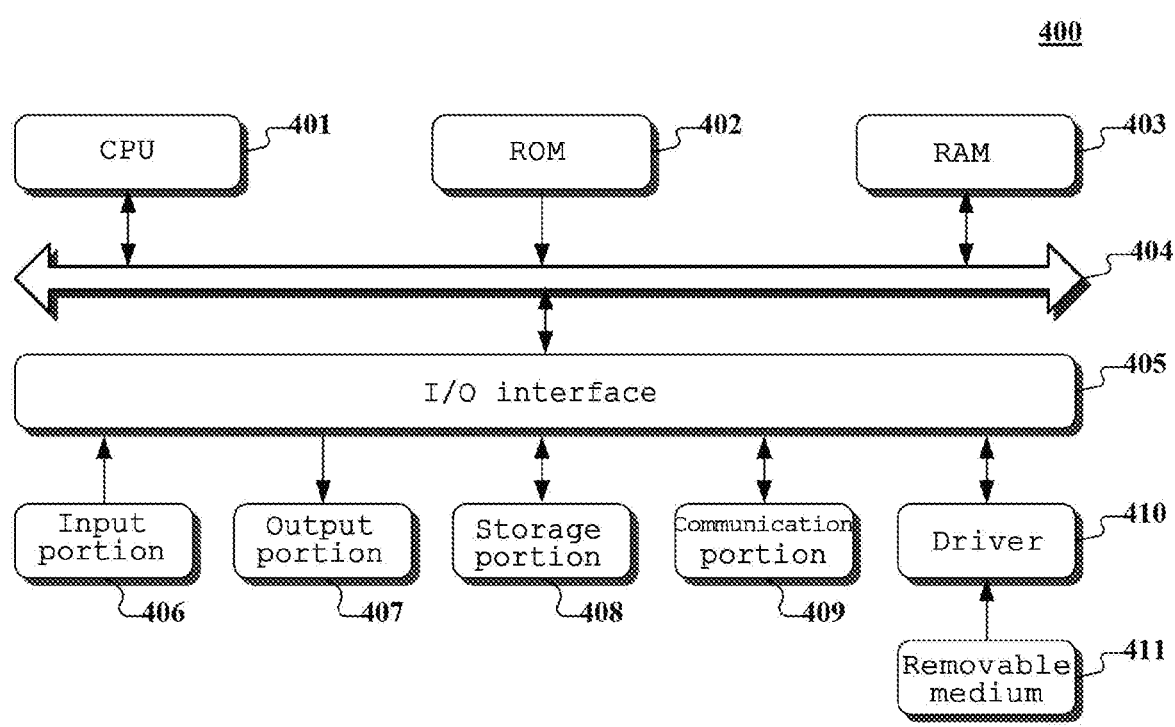
FIG. 4 is a schematic structural diagram of a computer system of a client or an emulation server applicable to implement some embodiments of the present disclosure.

Referring to FIG. 4, a schematic structural diagram of a computer system 400 adapted to implement a terminal apparatus or a server of some embodiments of the present disclosure is shown.

As shown in FIG. 4, the computer system 400 includes a central processing unit (CPU) 401, which may execute various appropriate actions and processes in accordance with a program stored in a read-only memory (ROM) 402 or a program loaded into a random access memory (RAM) 403 from a storage portion 408. The RAM 403 also stores various programs and data required by operations of the system 400. The CPU 401, the ROM 402 and the RAM 403 are connected to each other through a bus 404. An input/output (I/O) interface 405 is also connected to the bus 404.

The following components are connected to the I/O interface 405: an input portion 406 including a keyboard, a mouse etc.; an output portion 407 comprising a cathode ray tube (CRT), a liquid crystal display device (LCD), a speaker etc.; a storage portion 408 including a hard disk and the like; and a communication portion 409 comprising a network interface card, such as a LAN card and a modem. The communication portion 409 performs communication processes via a network, such as the Internet. A driver 410 is also connected to the I/O interface 405 as required. A removable medium 411, such as a magnetic disk, an optical disk, a magneto-optical disk, and a semiconductor memory, may be installed on the driver 410, to facilitate the retrieval of a computer program from the removable medium 411, and the installation thereof on the storage portion 408 as needed.

In particular, according to some embodiments of the present disclosure, the process described above with reference to the flowcharts may be implemented in a computer software program. For example, some embodiments of the present disclosure includes a computer program product, which comprises a computer program that is tangibly embedded in a machine-readable medium. The computer program comprises program codes for executing the method of the flowcharts. In such embodiments, the computer program may be downloaded and installed from a network via the communication portion 409, and/or may be installed from the removable media 411.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present disclosure further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs are executed by one device, such as an emulation server, the emulation server receives a test task and a test scenario set required for executing the test task sent from a client, the test scenario set comprising a plurality of test scenarios, and the client configured to provide a user with a man-machine interface to cause the user to configure the test task at the client; the emulation server distributes each of the test scenarios to first emulation executors respectively, and sending the test task to each of the first emulation executors, such that each of the first emulation executors executes the test task in parallel in one of the test scenarios; the emulation server acquires a test result of the test task from each of the first emulation executors; and the emulation server compares the acquired test result with a preset test standard to generate feedback information of the test task, and sending the feedback information to the client.

The foregoing is only a description of the some embodiments of the present disclosure and the applied technical principles. It should be appreciated by those skilled in the art that the inventive scope of the present disclosure is not limited to the technical solutions formed by the particular combinations of the above technical features. The inventive scope also covers other technical solutions formed by any combinations of the above technical features or equivalent features thereof without departing from the concept of the disclosure, such as, technical solutions formed by replacing the features as disclosed in the present disclosure with (but not limited to), technical features with similar functions.

Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for testing a vehicle, comprising:
   selecting, by a client, a test scenario set from a test scenario module, wherein the test scenario module is configured to store test scenarios and scenario data of the test scenarios in a categorical approach;
   receiving, by an emulation server, a test task and the test scenario set configured to execute the test task sent from the client, the test scenario set comprising a plurality of test scenarios, and the client configured to provide a user with a man-machine interface configured to cause the user to configure the test task at the client;
   distributing, by the emulation server, each of the test scenarios to a plurality of first emulation executors respectively, and sending the test task to each of the first emulation executors, such that each of the first emulation executors executes the test task in parallel in one of the test scenarios;
   acquiring, by the emulation server, a test result of the test task from each of the first emulation executors; and
   comparing, by the emulation server, the acquired test result with a preset test standard to generate feedback information of the test task, and sending the feedback information to the client,
   wherein the method further comprises:
   determining, by a first emulation executor from the plurality of first emulation executors, whether the scenario data of the test scenario distributed to the first emulation executor is in a local cache;
   in response to the scenario data of the test scenario distributed to the first emulation executor being in the local cache, acquiring, by the first emulation executor, the scenario data of the test scenario from the local cache; and
   in response to the scenario data of the test scenario distributed to the first emulation executor not being in the local cache, acquiring, by the first emulation executor, the scenario data of the test scenario from the test scenario module, and storing the acquired scenario data of the test scenario in the local cache.

2. The method according to claim 1, wherein before acquiring, by the emulation server, a test result of the test task from each of the first emulation executors, the method further comprises:
   scheduling, by the emulation server, a second emulation executor as a first emulation executor to re-execute the test task, when it is determined by the emulation server that the first emulation executor fails.

3. The method according to claim 2, wherein the first emulation executors are independent of one another.

4. The method according to claim 3, wherein a waiting queue is arranged in the emulation server; and wherein the method further comprises:
   querying, by the emulation server, whether there is an idle emulation executor;
   in response to there being an idle emulation executor, selecting, by the emulation server, a preset number of emulation executors from the idle emulation executor as a set of first emulation executors; and in response to there not being the idle emulation executor, storing, by the emulation server, the test task in the waiting queue and continuing querying until the idle emulation executor is determined.

5. A system for testing a vehicle, comprising an emulation server, a plurality of emulation executors, and a client, wherein:

the emulation server is configured to be connected to the emulation executors and to the client;

the client is configured to: provide a user with a man-machine interaction interface, configure a test task and a test scenario set configured to execute the test task in response to an operating instruction of the user, send the test task and the test scenario set to the emulation server, and receive feedback information of the test task sent from the emulation server, wherein the test scenario set comprises a plurality of test scenarios;

the plurality of the emulation executors are configured to: execute an identical test task in parallel in one of the test scenarios, generate test results, and send the test results to the emulation server; and the emulation server is configured to: distribute the test scenarios in the test scenario set received from the client to the emulation executors respectively, send the test task received from the client to each of the emulation executors, and compare the test result received from each of the emulation executors with a preset test standard to generate feedback information of the test task;

wherein the system further comprises a test scenario module configured to store the test scenarios and scenario data of the test scenarios in a categorical approach, wherein the test scenario module is configured to be connected to the client, such that the client selects the test scenario set from the test scenario module; and the test scenario module is further configured to be connected to an emulation executor of the plurality of the emulation executors; and wherein the emulation executor is configured to:

determine whether the scenario data of the test scenario distributed to the emulation executor is in a local cache;

in response to the scenario data of the test scenario distributed to the emulation executor being in the local cache, acquire the scenario data of the test scenario from the local cache; and in response to the scenario data of the test scenario distributed to the emulation executor not being in the local cache, acquire the scenario data of the test scenario from the test scenario module, and store the acquired scenario data of the test scenario in the local cache.

6. The system according to claim 5, wherein:

the emulation server is further configured to monitor a health state of each of the emulation executors, and schedule a normal emulation execute to replace a failed emulation executor when the failed emulation executor is determined.

7. The system according to claim 6, wherein the emulation executors are independent of one another.

8. The system according to claim 7, wherein:

the emulation server is further configured to query whether there is an idle emulation executor, and select the idle emulation executor to execute the test task; and a waiting queue is arranged in the emulation server and configured to store the test task when no idle emulation executor is determined.

9. A non-transitory computer storage medium storing a computer program, which when executed by one or more processors, causes the one or more processors to perform operations comprising:

selecting, by a client, a test scenario set from a test scenario module, wherein the test scenario module is configured to store test scenarios and scenario data of the test scenarios in a categorical approach;

receiving, by an emulation server, a test task and the test scenario set configured to execute the test task sent from the client, the test scenario set comprising a plurality of test scenarios, and the client configured to provide a user with a man-machine interface to cause the user to configure the test task at the client;

distributing, by the emulation server, each of the test scenarios to a plurality of first emulation executors respectively, and sending the test task to each of the first emulation executors, such that each of the first emulation executors executes the test task in parallel in one of the test scenarios;

acquiring, by the emulation server, a test result of the test task from each of the first emulation executors; and comparing, by the emulation server, the acquired test result with a preset test standard to generate feedback information of the test task, and sending the feedback information to the client, wherein the operations further comprise:

determining, by a first emulation executor from the plurality of first emulation executors, whether the scenario data of the test scenario distributed to the first emulation executor is in a local cache;

in response to the scenario data of the test scenario distributed to the first emulation executor being in the local cache, acquiring, by the first emulation executor, the scenario data of the test scenario from the local cache; and in response to the scenario data of the test scenario distributed to the first emulation executor not being in the local cache, acquiring, by the first emulation executor, the scenario data of the test scenario from the test scenario module, and storing the acquired scenario data of the test scenario in the local cache.

10. The non-transitory computer storage medium according to claim 9, wherein the operations further comprise:

before acquiring, by the emulation server, a test result of the test task from each of the first emulation executors:

scheduling, by the emulation server, a second emulation executor as a first emulation executor to re-execute the test task, when it is determined by the emulation server that the first emulation executor fails.

11. The non-transitory computer storage medium according to claim 10, wherein the first emulation executors are independent of one another.

12. The non-transitory computer storage medium according to claim 11, wherein a waiting queue is arranged in the emulation server, and wherein the operations further comprise:

querying, by the emulation server, whether there is an idle emulation executor;

in response to there being an idle emulation executor, selecting, by the emulation server, a preset number of emulation executors from the idle emulation executor as a set of first emulation executors; and in response to there not being the idle emulation executor, storing, by the emulation server, the test task in the waiting queue and continuing querying until the idle emulation executor is determined.

\* \* \* \* \*

UNITED STATES PATENT AND TRADEMARK OFFICE
CERTIFICATE OF CORRECTION

PATENT NO. : 10,699,036 B2
APPLICATION NO. : 15/385476
DATED : June 30, 2020
INVENTOR(S) : Tianlei Zhang et al.

Page 1 of 1

It is certified that error appears in the above-identified patent and that said Letters Patent is hereby corrected as shown below:

On the Title Page

Column 1, Item (30), Line 1, under Foreign Application Priority Data, delete "(JP)" and insert --(CN)--.

Signed and Sealed this
Twenty-ninth Day of September, 2020

Andrei Iancu
*Director of the United States Patent and Trademark Office*